United States Patent
Castro et al.

(10) Patent No.: US 10,574,669 B1
(45) Date of Patent: *Feb. 25, 2020

(54) PACKET FILTERS IN SECURITY APPLIANCES WITH MODES AND INTERVALS

(71) Applicant: AREA 1 SECURITY, INC., Menlo Park, CA (US)

(72) Inventors: Javier Castro, Silver Spring, MD (US); Blake Darche, Finksburg, MD (US); Chiraag Aval, Menlo Park, CA (US)

(73) Assignee: Area 1 Security, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,992

(22) Filed: Jan. 18, 2019

Related U.S. Application Data

(63) Continuation of application No. 15/638,158, filed on Jun. 29, 2017, now Pat. No. 10,187,400, which is a (Continued)

(51) Int. Cl.
*H04L 29/06* (2006.01)
*H04L 12/26* (2006.01)

(52) U.S. Cl.
CPC .......... *H04L 63/1408* (2013.01); *H04L 43/04* (2013.01); *H04L 43/12* (2013.01);
(Continued)

(58) Field of Classification Search
CPC ............... H04L 43/062; H04L 63/1408; H04L 63/0227; H04L 63/1425; H04L 43/028
See application file for complete search history.

(56) References Cited

U.S. PATENT DOCUMENTS 6,006,328 A  12/1999  Drake
8,272,060 B2  9/2012  Milliken
(Continued)

OTHER PUBLICATIONS

Jiang, U.S. Appl. No. 15/217,587, filed Jul. 22, 2016, Restriction Requirement, dated Jun. 6, 2018.
(Continued)

*Primary Examiner* — El Hadji M Sall
(74) *Attorney, Agent, or Firm* — Hickman Palermo Becker Bingham LLP; Malgorzata A. Kulczycka

(57) ABSTRACT

A computer system programmed to provide improved packet capture comprises: a plurality of sensor computers each programmed to capture data packets directed to a different compromised computer; a command server that is programmed to determine an expiration time for capturing a first set of data packets that have been routed toward a first compromised computer, to determine a time interval indicating an interval for capturing the first set of data packets, to identify a first packet capture filter of a plurality of packet capture filters for a first sensor computer of the plurality of sensor computers, to transmit, via a communications network, the first packet capture filter and a message, which comprises the time interval and the expiration time, to the first sensor computer of the plurality of sensor computers to capture the first set of data packets every the time interval and until the expiration time expires.

20 Claims, 8 Drawing Sheets

Related U.S. Application Data continuation-in-part of application No. 15/051,475, filed on Feb. 23, 2016, now Pat. No. 10,038,603.

(52) U.S. Cl.
CPC ...... H04L 63/0227 (2013.01); H04L 63/1425 (2013.01); *H04L 63/0245* (2013.01); *H04L 63/0254* (2013.01)

(56) References Cited

U.S. PATENT DOCUMENTS

| | | |
|---|---|---|
| 9,350,750 B1 | 5/2016 | Aval |
| 9,356,942 B1 | 5/2016 | Joffe |
| 2008/0244739 A1 | 10/2008 | Liu |
| 2013/0343390 A1 | 12/2013 | Moriarty |
| 2017/0005805 A1* | 1/2017 | Wang .................. H04L 9/3263 |

OTHER PUBLICATIONS

Darche, U.S. Appl. No. 15/051,475, filed Feb. 23, 2016, Office Action, dated Jan. 26, 2018.
Darche, U.S. Appl. No. 15/051,475, filed Feb. 23, 2016, Notice of Allowance, dated Jun. 5, 2018.
Castro, U.S. Appl. No. 15/638,158, filed Jun. 29, 2017, Notice of Allowance, dated Sep. 24, 2018.

* cited by examiner

802 — 1. Sustinaed task of 1.2.3.4 which may be interesting
　　▶ BPF: "host 1.2.3.4", Expires: 60 days, Interval: 0 days
804 — 2. Sustained task of 5.6.7.8 which is known actor IP
　　▶ BPF: "host 5.6.7.8", Expires: 180 days, Interval: 0 days
806 — 3. Renew sustained task of 1.2.3.4 which has been found to be an actor IP
808 — ▶ BPF: "host 1.2.3.4", Extend: 120 days　　, Interval: 0 days
　　▶ BPF: "host 1.2.3.4", Expires: 180 days　, Interval: 0 days
810 — 4. Survey task of Great Firewall IP 9.10.11.12 to collect data every other day to check for injected data
　　▶ BPF: "host 9.10.11.12", Expires: 60 days, Interval: 1 day
812 — 5. Automated system to recover Poison Ivy passwords on port 3344, but high volume uninteresting traffic
　　▶ BPF: "port 3344", Expires: 60 days, Interval: 1 day
814 — 6. Back end can handle all Poison Ivy traffic so move survey to sustained and extend expiration date
816 — ▶ BPF: "port 3344", Extend: 120 days, Interval: 1 day
　　▶ BPF: "port 3344", Expires: 180 days　, Interval: 0 days

Teacup: IP Expired Alert BOT [13:13]
>>>*Rule* :host 12.12.15.19
*Sensor* : SENSOR_1
*Create Date* :2016-06-16 00:00:00
*Expired Date* :2016-06-16 00:00:00
*Renew-link* : http://teacup.area1.internal/teacup/uuid=0bd7355d-8dc8-4541-837a-c1fdb2acbf06&filter=aG9zdCAxMi4xMi4xNS4xOQ==&expires=15778476
:fire: :fire: :fire: *EXPIRED YESTERDAY* :fire: :fire: :fire:

FIG. 8B

PACKET FILTERS IN SECURITY APPLIANCES WITH MODES AND INTERVALS

BENEFIT CLAIM

This application claims the benefit under 35 U.S.C. § 120 as a continuation of application Ser. No. 15/638,158, filed Jun. 29, 2017, which is a Continuation-in-part of Ser. No. 15/051,475, filed Feb. 23, 2016, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE DISCLOSURE

The present disclosure generally relates to computer security techniques applicable to computers that have been compromised with bots and other malware and relates more specifically to techniques for packet capture using a distributed network of sensor computers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In computer networking and security, one of the problems involves the installation of bots or other malicious software ("malware") on unsuspecting computers ("compromised computers") that are then employed by an attacker to carry out attacks on third computers, often associated with a business, enterprise, or other institution. The manner in which the attacker takes control of a compromised computer and initiates attacks on the third computers can be difficult to determine because identifying the ultimate attacker is usually challenging.

Present techniques attempting to address the foregoing problem domain generally have been found to be ineffective, slow, or incomplete, so that improved solutions are needed.

SUMMARY

The appended claims may serve as a summary of the approach.

BRIEF DESCRIPTION OF THE DRAWINGS

In the drawings:

FIG. 8A depicts example notification messages.

FIG. 8B depicts an example expiration message.

DETAILED DESCRIPTION

Figure 1:
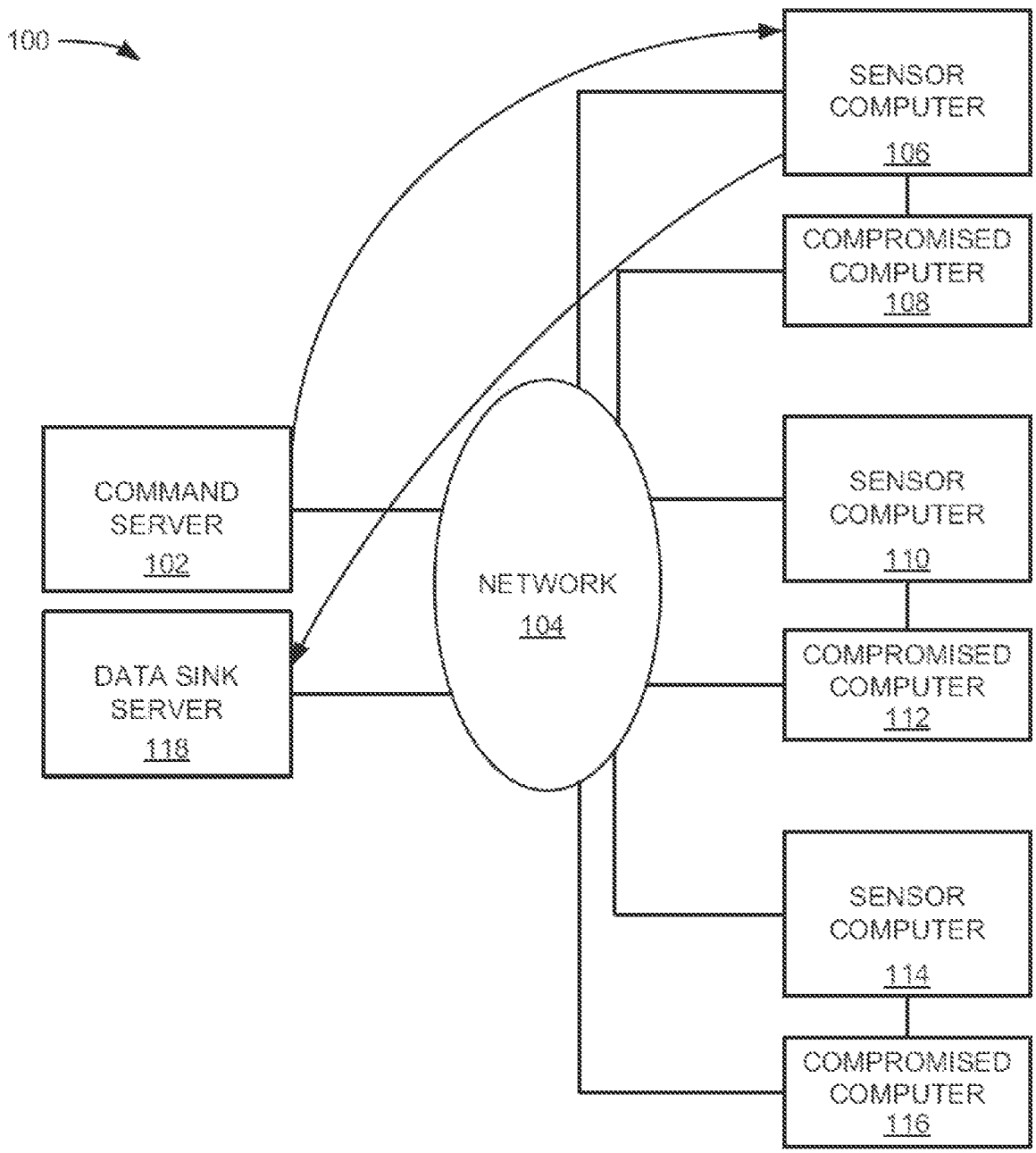
FIG. 1 illustrates a computer networking environment featuring a command server and one or more sensor computers located near compromised computers.

In the following description, for the purposes of explanation, numerous specific details are set forth in order to provide a thorough understanding of the present approach. It will be apparent, however, that the present approach may be practiced without these specific details. In other instances, well-known structures and devices are shown in block diagram form in order to avoid unnecessarily obscuring the present approach.

Embodiments are described herein according to the following outline:
   1.0 General Overview
   2.0 Example Network Topology
   3.0 Process Overview
   4.0 Network Packet Filters
      4.1 A Survey Collection Mode
      4.2 A Sustained Collection Mode
      4.3 Time Intervals
      4.4 Expiration Times
   5.0 Configuring a Sensor to Collect Data Packets
   6.0 Configuring a Command Server to Manage Sensors
   7.0 Example Notification Messages
   8.0 An Example Expiration Message
   9.0 Alert Messages
   10.0 Workload Evaluation
   11.0 Implementation Mechanisms—Hardware Overview

1.0 General Overview

In an embodiment, a computer system is programmed to provide improved packet capture using a flexible automatic packet filter installation and configuration approach. The computer system comprises: a plurality of sensor computers each programmed to capture data packets directed to a different compromised computer from one or more attacker computers; a command server that is programmed to identify a first packet capture filter of a plurality of packet capture filters for a first sensor computer of the plurality of sensor computers, to transmit, via a communications network, the first packet capture filter to the first sensor computer of a plurality of sensor computers, wherein the first packet capture filter is programmed to cause the first sensor computer to capture a first set of data packets that have been routed toward a first compromised computer, and to identify a second packet capture filter of the plurality of packet capture filters for a second sensor computer of the plurality of sensor computers, to send, via the communications network, wherein the second packet capture filter is programmed to cause the second sensor computer to capture a second set of data packets that have been routed toward a second compromised computer, and to instruct the first sensor computer to capture data packets using the first packet capture filter and to instruct the second sensor computer to capture a second set of data packets using the second packet capture filter.

In an embodiment, a computer system for improved packet capture in a networked environment comprises: a sensor computer in electronic communication with a command server and coupled to a compromised computer, the sensor computer programmed to receive, via a communications network, a first packet capture filter transmitted to the sensor computer and an instruction to capture data packets using the first packet capture filter, and to capture, using a first packet capture filter received from the command server, a set of data packets communicated by a compromised computer coupled to the sensor computer that match the first packet capture filter, and to periodically upload the set of data packets to a data sink server.

The mode of attack in which the attacker takes control of a compromised computer and uses it to initiate attacks on third computers can be difficult for security experts to fully remediate because of problems in identifying the ultimate attacker. When the attacker computer is located behind a firewall, or owned and operated by a malicious state actor, it may be practically impossible to identify the true actor. Further, the owner or operator of the compromised computer may be unaware that the malware is present on the system or used to initiate attacks against others. However, the target of the attack—such as a business enterprise—often can determine that it is under attack, and often can trace the source of the attack to a compromised computer. With information about the location of compromised computers, the techniques described herein can be deployed to provide effective means to collect packets sent to the compromised computer that match a packet capture filter deployed on a sensor computer coupled to the compromised computer.

While each of the drawing figures illustrates a particular embodiment for purposes of illustrating a clear example, other embodiments may omit, add to, reorder, and/or modify any of the elements shown in the drawing figures.

2.0 Example Network Environment

Figure 2:
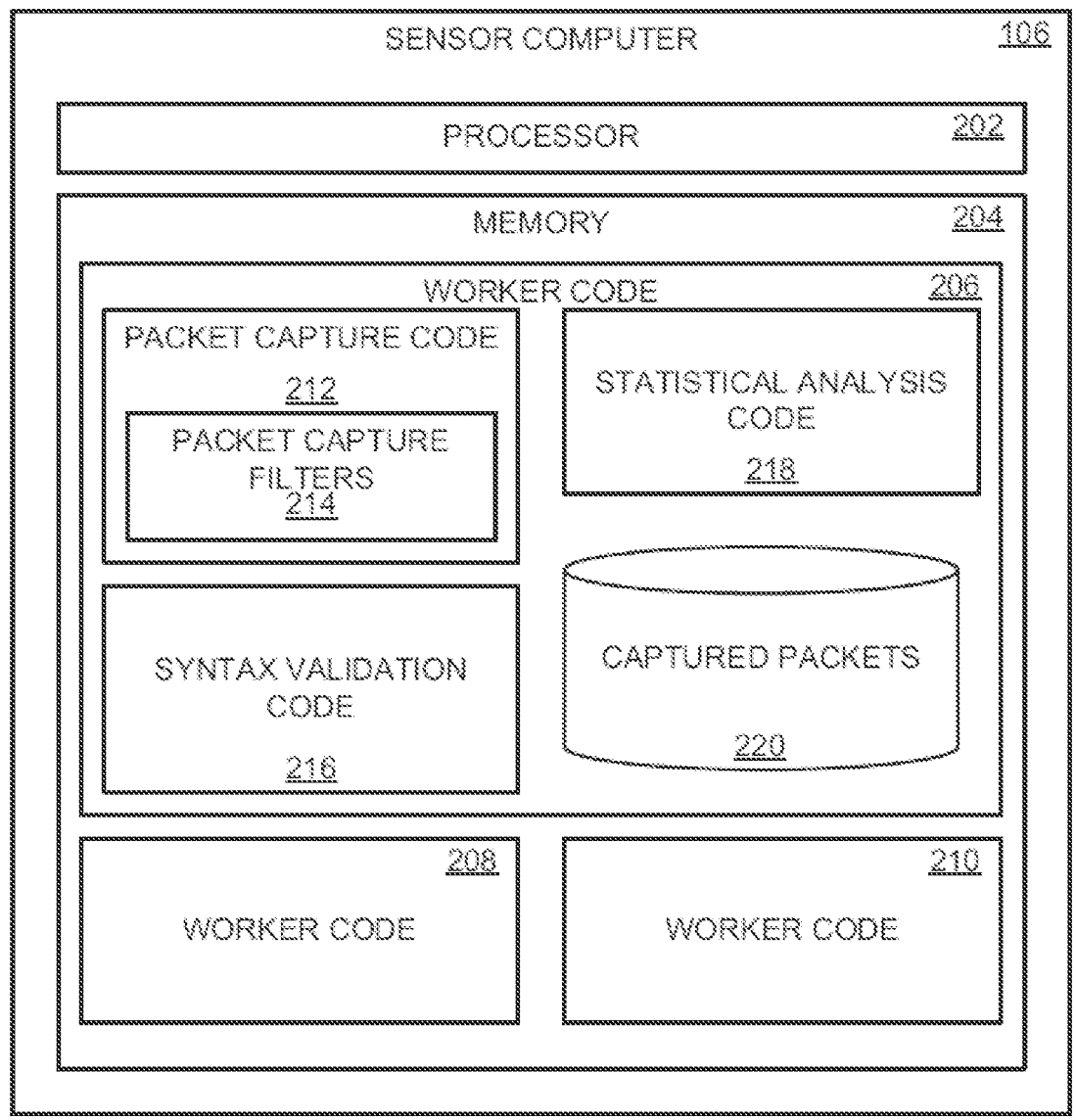
FIG. 2 illustrates an example of logical and functional elements of a sensor computer.

FIG. 1 illustrates a computer networking environment featuring a command server and one or more sensor computers located near compromised computers. FIG. 2 illustrates an example of logical and functional elements of a sensor computer.

Referring first to FIG. 1, in one embodiment, an example networked environment may have as principal elements a command server 102 coupled to a network 104, a plurality of sensor computers 106, 110, and 114, a plurality of compromised computers 108, 112, and 116, and a data sink server 118. FIG. 1 represents just one example of a possible networked environment in which embodiments may be used; the general approaches and algorithms disclosed herein may be applied in many other environments or network arrangements.

The command server 102 is configured or programmed to provide packet capture filters to each of the sensor computer 106, 110, and 114. The sensor computers 106, 110, and 114 are configured to access and evaluate data packets sent to or by a compromised computer. The sensor computers use the packet capture filters to evaluate the packets. In some embodiments, the command server 102 performs a syntax validation on the packet capture filters. The command server 102 receives a request for packet capture filters from a sensor computer 106 that identifies the sensor computer 106. The command server 102 responds to the request with an instruction to retrieve zero, one, or more data packets filters stored at the command server 102.

The command server 102 is further configured or programmed to generate and maintain records indicating, for each sensor computer, the packet capture filters that have been sent to or retrieved by the sensor computer. Each sensor computer may have a different set of packet capture filters for capturing packets. The command server 102 assigns each sensor computer a globally unique identifier (GUID) that is used by the sensor computer to self-identify when communicating with the command server 102. The command server 102 may store the GUID of a sensor computer in association with identifiers of packet capture filters that have been sent to the sensor computer identified by the GUID.

Further, the command server 102 may, for each sensor computer, instruct the sensor computer to turn on or off one or more of the packet capture filters stored thereon. The individual packet capture filters, when turned on, operate to collect data packets at the sensor computer that match one or more conditions included in the packet capture filter. When the individual packet capture filters are turned off, the sensor computer ceases collecting the data packets at the sensor computer using the packet capture filter.

The command server 102 may maintain a log tracking the activity of the sensor computers. The log may include an identifier of each packet capture filter sent to the individual sensor computer, a date and time indicating when the packet capture filters were sent to each sensor computer, and dates and times when each of the packet capture filters is turned on or off. The command server 102 may support an audit feature, using which, an administrator may access the log.

The command server 102 may further store configuration files describing each of the sensor computers. The configuration files may include information about the sensor computer and/or its associated compromised computer. The configuration for a sensor computer includes local host paths, a remote network address, and variables required to collect packets in a dynamic environment. In some instances, each sensor configuration includes data such as:

uuid: a unique identifier for the sensor to differentiate the sensor from other assets on a collection platform;

upload_dir: a directory to place a file to initiate a file upload;

process_dir: an interim directory to place a file after packaging (compression) and prior to upload;

interface: a list of commas separated interfaces to perform packet capture;

pcap_dir: a directory to place ongoing packet dumps for the packet captures;

pcap_size: a designated size to begin packaging current pcap file and start a new pcap file;

server: a central server to receive network filters for pcap collection, send health status of the packet collection tool, and to upload packet capture statistics;

update_timeout (optional): an interval of time to check for new network filters and update the packet capture tools health and packet capture stats;

upload_timeout (optional): an interval of time to check for processed pcap files to upload to the data sink.

An example of a configuration is included below:
Sensor configuration variables
[sensor]
uuid=xxxxxxxx-xxxx-xxxx-xxxx-xxxxxxxxxxxx
upload_dir=/data/upload
process_dir=/data/process
Teacup configuration variables
[teacup]
interface=eth0, eth1, eth2
pcap_dir=/data/pcap pcap_size=2 GB
server=192.168.0.1
Check for update every 15 minutes. (Default is 15 minutes if this field is not set) update_timeout=900
Check for new files to upload every 5 minutes. (Default is 5 minutes if this field is not set) upload_timeout=300

The command server 102 receives, from each of the sensor computers, metadata about the packet capture filters and data packets that are captured using the packet capture filters that are turned on at each of the sensor computers. The metadata may include, for example, for each packet capture filter, a number of data packets captured by the packet capture filter. Using the metadata, the command server 102 may instruct the respective sensor computer to turn off a packet capture filter that is deemed redundant to other packet capture filters that are turned on at the sensor computer or that is not capturing data packets because none or few of the data packets match the packet capture filter. If a particular packet capture filter is associated with metadata indicating that it is successfully capturing packets of interest at another sensor computer, the command server 102 may instruct the sensor computer to turn on the packet capture filter if the packet capture filter is already stored at the sensor computer.

A packet capture filter may be turned on/off for a number of reasons that are determined external to the Packet Capture Collection Tasking System including:
  Network filters may be applied when observed malicious traffic is detected via network signatures or heuristics.
    May identify new IPs from which malicious traffic originates
    May identify domains resolving to new IPs.
  Network filters may be applied when malicious actor owned infrastructure transitions to new IPs
  Network filters may be turned off when heuristics identify a network filter that no longer collects malicious activity:
    An IP is no longer owned by a malicious actor
    A domain no longer resolves to an IP
  Network filters may be turned off when malware command & control no longer matches the network filter.

Network 104 comprises one or more local networks, wide area networks, and/or internetworks and may comprise the public internet in whole or in part. In an embodiment, the compromised computer 108 hosts or executes malware that was previously obtained from or installed by an attacker computer (not depicted) that may be any computer that is ultimately used to initiate an attack, or the distribution of bots, other malware or viruses, and may be located within the same geographic region as other elements of FIG. 1 or in a different region. The compromised computer 108 may be coupled to network 104 indirectly through a firewall that is typically co-located with the compromised computer. The compromised computer 108 may host a browser. The compromised computer 108 may be a server computer of an enterprise that services file requests or serves web pages to one or more users of the enterprise. Thus, compromised computer 108 may broadly represent two or more computers within an enterprise, one or more of which is compromised, and/or one or more of which accesses or uses the computer for another purpose.

In an embodiment, sensor computer 106 is deployed physically near or at least in the same LAN segment as the compromised computer 108 and logically behind the firewall positioned between the compromised computer 108 and the network 104. Sensor computer 106 is coupled to compromised computer 108, and/or the firewall, and configured as a network tap to enable the sensor computer 106 to receive and inspect all packets or other data communications that the compromised computer 108 sends or receives. For example, sensor computer 106 is configured to obtain copies of all packets arriving from network 104 and directed to the compromised computer 108 on any interface of the compromised computer, and originating from the attacker computer, a third-party website, or any other data source. Typically, the sensor computer 106 obtains packets from the compromised computer 108 in a transparent manner without affecting transit of the packets.

In an embodiment, as sensor computer 106 receives and inspects packets directed to the compromised computer 108, the sensor computer 106 creates and stores sensor data that describes aspects of the packets, attacks, or related metadata. In an embodiment, the sensor data is locally stored at the sensor computer 106 and periodically forwarded to data sink server 118; for example, the sensor computer 106 may serve as a local cache that is periodically flushed to the data sink server 118 for persistent storage in one of the databases.

According to various embodiments, rather than saving data about every packet inspected, the sensor computer 106 saves data describing only a subset, or portion, of the packets. To determine whether any one particular data packet is saved or used in the generation of metadata, one or more packet capture filters are used to analyze the packet. The sensor computer 106 obtains the packet capture filters from the command server 102 and saves them to a memory. In some embodiments, the sensor computer 106 turns the packet capture filters on or off in response to instructions received from the command server 102. Each data packet is compared to one or more conditions defined by the packet capture filter. If the data packet satisfies the conditions, a copy of the data packet is saved and can be used in the generation of metadata. Data packets that do not satisfy the conditions of at least one packet capture filter are not saved or used in the generation of metadata. The data packets are allowed to pass to the compromised computer 108.

The sensor computer 106 typically is used, owned and operated by an entity different than that of compromised computer 108; for example, the sensor computer may be owned or operated by a security organization or enterprise that also owns, operates or uses the command server 102.

Placement of sensor computers 106, 110, and 114 may be performed by identifying malicious activity at a central location and tracing the activity to a particular compromised computer, then contacting the owner of that computer and reaching an agreement to place a sensor computer 106, 110, or 114 coupled to that compromised computer 108, 112, or 116. For example, the owner could be paid a research fee to permit local inspection of traffic to or from the compromised computer. The identification may use a variety of techniques including following malicious traffic from an available computer toward other computers that are compromised without the knowledge of their owners or operators, seed programs, malware reverse-engineering, and so forth.

Functions of sensor computers 106 generally may include filtering on ports of interest such as remote desktop protocol; RTP; SSL; SFTP; FTP; and others; detecting when message output or packet output reaches a certain capacity; detecting session construction for sessions with other computers; and analysis of intervals of times of day when messages are sent or when certain ports are used in packets. In all these examples, passive monitoring of traffic on ports is performed, data is stored locally on the sensor computer 106 and then periodically data is sent in reports to the data sink server 118. The data also can be fingerprinted to create signatures of observed packet patterns. Data collection at sensor computers 106, 110, and 114 also may comprise collecting usernames or e-mail addresses from phishing emails that a particular user clicks through; the username can be used to more finely correlate a particular bad set of data with a particular user, rather than a particular machine.

For the purpose of illustrating a clear example, FIG. 1 shows three sensor computers 106, 110, and 114 each coupled to a single compromised computer 108, 112, and 116, respectively. However, in other embodiments, there may be any number of sensor computers deployed in geographically distributed locations and associated with many different compromised computers that are owned and operated by different parties. Thus, this disclosure specifically contemplates the deployment of a large, widespread, geographically distributed overlay network consisting of large numbers of sensor computers, all reporting data to and interoperating with one or more command servers 102 that manage and control the sensor computers, where each of the sensor computers is co-located with a different compromised computer in a different location. The compromised computers may be owned by, operated by, or used by completely different and unrelated companies, enterprises, institutions or other parties, and may have been compromised by any number of different attacker computers at different times. Additionally, or alternatively, two or more of the compromised computers may be at the same physical location or in the same general geographic region, such as a store, campus or territory, and coupled to a single sensor computer 106 or multiple different sensor computers.

The sensor computers 106, 110, and 114 send the captured data packets, or copies thereof, to the data sink server 118. The sensor computers 106 is configured with a particular file size of the aggregated captured data packets, or data collection time interval, which, when reached by virtue of capturing data packets, triggers a process at the sensor computer 106 that results in the data packets being sent to the data sink server 118. When the data collection time interval is reached, the sensor computer 106 is configured or programmed to stop recording the data packets to a current file in memory and to create a new file in the memory. Any subsequent captured data packets are saved to the new file. The sensor computer 106 compresses the current file, performs any other operations such as encrypting the current file, and sends the current file to the data sink server 118. The data sink server 118 is configured or programmed to store the data packets captured by the sensor computers 106, 110, and 114.

FIG. 2 illustrates an example of logical and functional elements of the sensor computer 106. In an embodiment, the sensor computer 106 comprises a processor 202 and a memory 204. The memory 204 stores sets of computer-readable instructions that are executable by the processor 202 and that transform a general purpose computer to a special purpose machine, namely the sensor computer 106. In some embodiments, the computer-readable code 204 comprises one or more instances of worker code 206, 208, and 210. Each instance of the worker code 206, 208, and 210 may collect, filter, and store data packets from different ports of interest of the compromised computer 108.

Packet capture code 212 is configured or programmed to receive the data packets sent by or to the compromised computer 108. The packet capture code 212, using stored filters 214, evaluates each data packets against the stored packet capture filters 214. The stored packet capture filters 214 are received from the command server 102. Syntax validation code 216 is configured or programmed to request and obtain the filters from the command server 102 and validate the obtained filters by determining that the syntax within the filter is valid.

The packet capture filters 214 may vary between the sensor computers such that sensor computer 106 may have a different set of filters than either of sensor computer 110 and sensor computer 114. Further, the number of packet capture filters 214 that are turned on at any given time may be limited to prevent performance degradation of the sensor computer 106.

Each of the filters 214 comprises data that may be contained within a data packet. If the data matches the data packet, the filter 214 causes the data packet to be stored in captured packets database 220 at the sensor computer 106. A packet capture filter may include an IP address of interest, a port of interest, traffic that is of interest, or other data packet features that are of interest. In some embodiments, the packet capture filters 214 may in the Berkeley Packet Filter (BPF) format.

Statistical analysis code 218 is configured or programmed to analyze the captured data packets stored in the captured packets database 218. The resulting analysis data may include a count of the number of data packets captured, a size of the captured data packets, the packet capture filters used to capture the packets, counts of the number of data packets captured by each of the packet capture filters 214, and the like. The statistical analysis code 218 may receive and respond to requests from the command server 102 for the analysis data. The statistical analysis code 218 may further respond to requests from the command server 102 or the data sink server 118 to send the captured data packets to the data sink server 118 before the data collection time interval associated with the sensor computer expires. The command server 102 may use the analysis data to turn on or off packet capture filters, to identify additional packet capture filters to add to the packet capture filters 214, or to identify packet capture filters to remove from the sensor computer 106.

3.0 Process Overview

Figure 3:
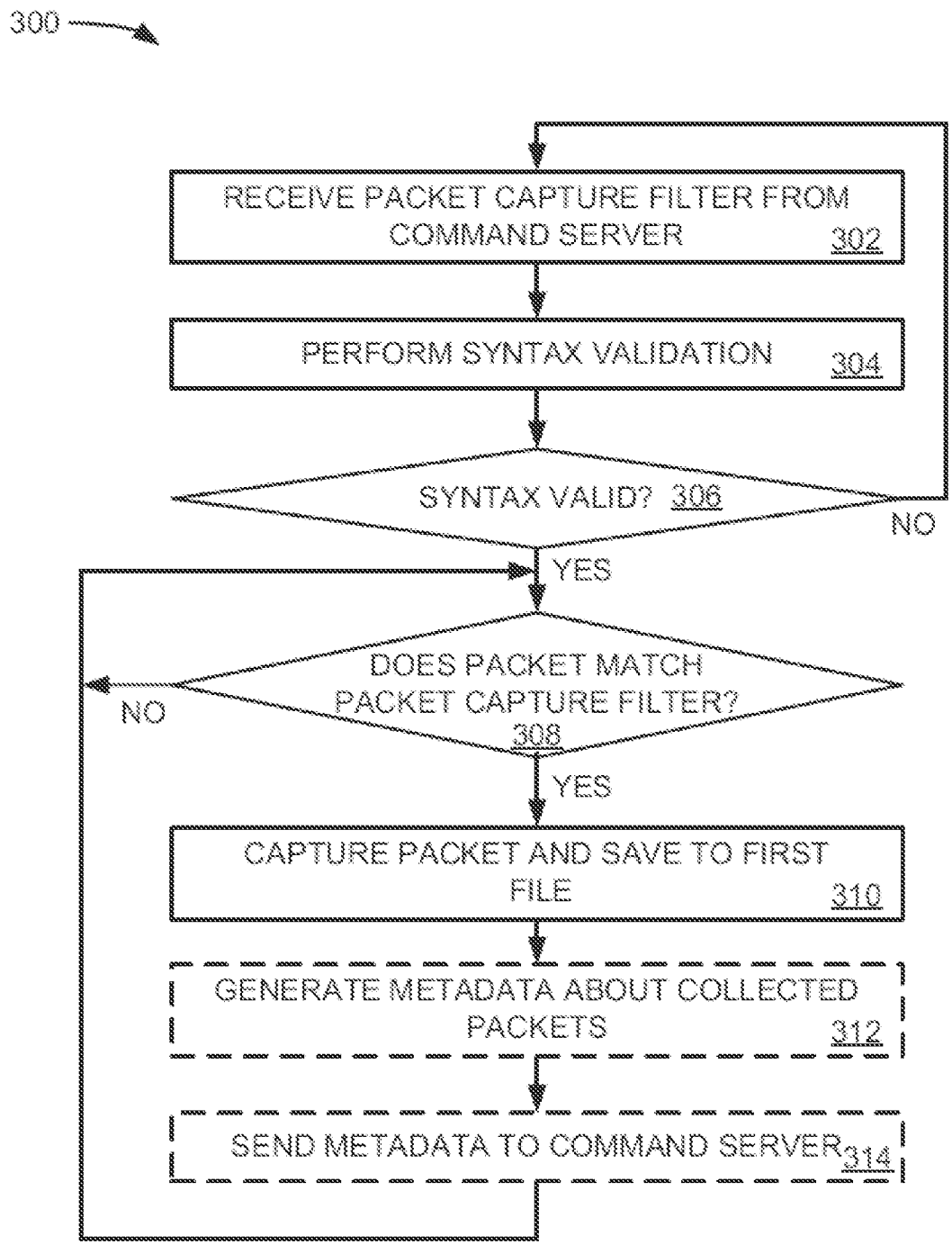
FIG. 3 illustrates a process of obtaining filters from the command server and filtering packets using the obtained filters, according to various embodiments.

FIG. 3, and each other flow diagram in this disclosure, illustrates an algorithm that may be used as a basis of coding one or more computer programs, scripts or other software elements that programmatically implement the functions that are shown in the flow diagram. Further, FIG. 3 and each other flow diagram in this disclosure are set forth at the same level of skill that is customarily used within the relevant technical field for skilled software engineers and programmers to communicate among themselves about the functions in this disclosure and how to program them. FIG. 3 illustrates a process 300 of obtaining packet capture filters from the command server 102 and filtering data packets using the obtained filters, according to various embodiments. The process 300 further provides for the statistical analysis of the captured data packets. The process 300 is performed by the sensor computers 106, 110, and 114 and may be repeated for each filter stored in packet capture filters 214.

In an operation 302, the sensor computer receives a packet capture filter from the command server 102. The sensor computer may request data filters according to a time interval. The time interval may be determined according to a number of factors including, but not limited to, traffic to or from the compromised computer, an immediacy of identifying attacks or malware at the corresponding compromised computer, a capacity of the command server 102, a number of other sensor computers dispatched by the command server 102, and a history of malicious traffic at the compromised computer. In response to the request, the command server 102 may push a packet capture filter to the sensor computer or instruct the sensor computer to turn on a packet capture filter already stored in memory at the sensor computer.

In an operation 304, the sensor computer performs syntax validation of the received packet capture filter. The syntax validation comprises checking that the data in the packet capture filter is usable to identify data packets and/or to detect whether the packet capture filter was corrupted in transmission for the command server 102.

In an operation 306, the sensor computer determines whether the syntax in the packet capture filter is valid. If the syntax is invalid, the process 300 returns to the operation 302 and the packet capture filter may be requested again.

If the syntax is valid, the sensor computer initiates data packet capture in operation 308 by determining whether the data packet matches at least one of the packet capture filters that are turned on at the sensor computer. The data packets accessed via the sensor tap at the compromised computer are compared to the packet capture filter. The packet capture filter may indicate, for example, an IP address that is of interest because it is a known source of malware. If the data packet does not match the filter, the data packet is not stored and the operation 308 is repeated for a next data packet.

In an operation 310, if the data packet matches the packet capture filter, the sensor computer captures the matching data packet and saves it to a first file in the captured packets database 220. The captured packet is stored locally on the sensor computer until the first file is sent to the data sink server 118 as described in connection with FIG. 4.

In an optional operation 312, the sensor computer generates metadata describing the captured data packets stored in the first file. The metadata can be generated as part of the process 300 during data capture or as part of a process operating independently from the process 300. The metadata may include a size of the first data file, a number of data packets stored in the first data file, the filters that were matched by the data packets, and other metadata.

In an optional operation 314, the sensor computer sends the generated metadata of the operation 312 to the command server 102. The sensor computer may send the generated metadata according to an interval or schedule, or in response to a request for the metadata from the command server 102.

Figure 4:
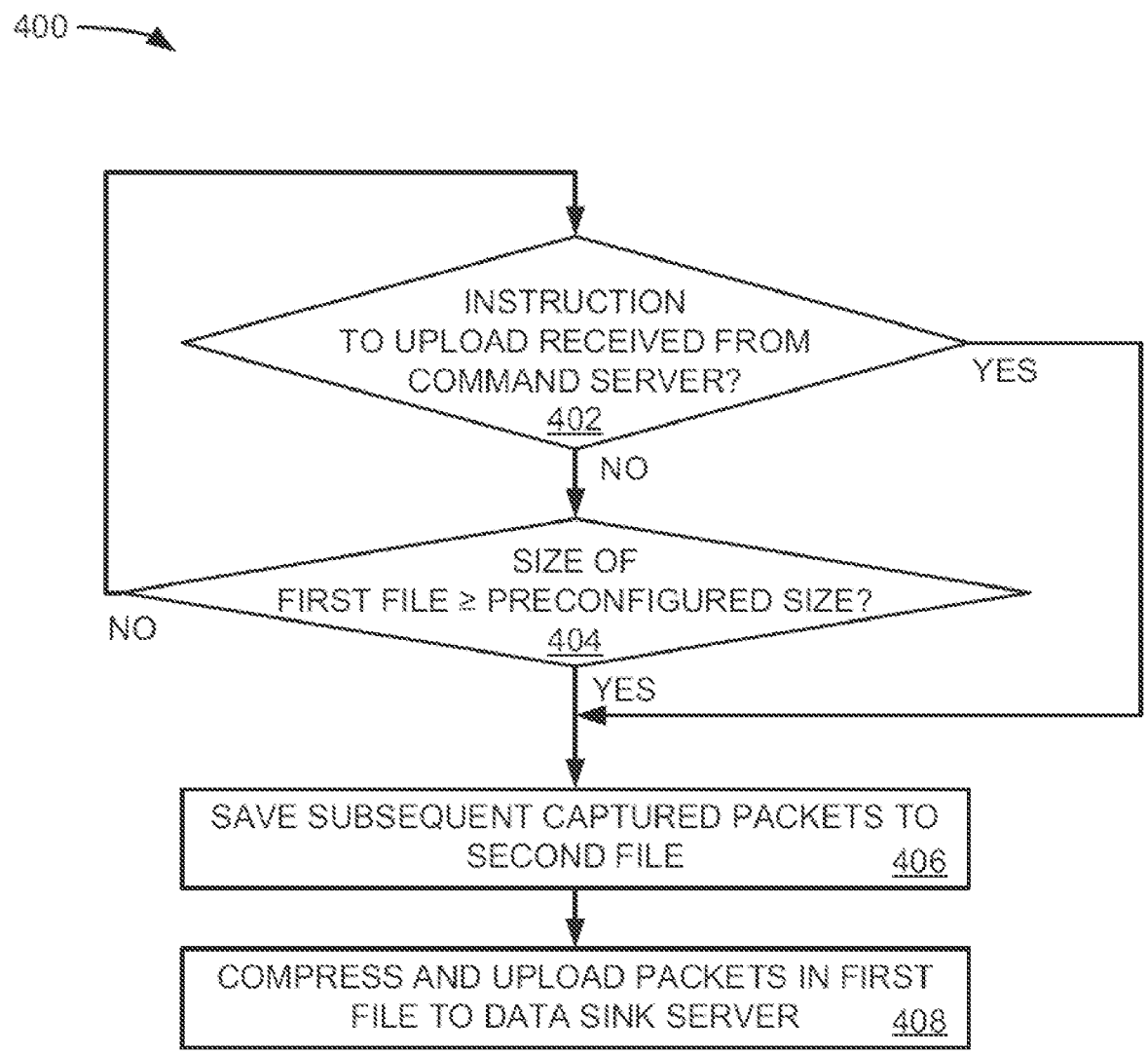
FIG. 4 illustrates a process of uploading captured packets to a data sink server, according to various embodiments.

FIG. 4 illustrates a process 400 of uploading captured packets to a data sink server 118, according to various embodiments. The process 400 is performed independently of the process 300 so that data packet capture can continue while earlier data packets are being made ready for transmission to the data sink server 118. The process 400 is performed by the sensor computers 106, 110, and 114.

In an operation 402, a determination is made as to whether an instruction to upload captured data packets has been received from the command server 102. The command server 102 may request an upload based on the generated metadata of the operations 312 and 314.

In an operation 404, if no request has been received, a determination is made as to whether a size of the first file of the operation 310 is greater than or equal to a preconfigured size. The preconfigured size can be determined based on bandwidth of a network connection between the sensor computer and the data sink server 118, a processing capacity of the sensor computer, an amount of memory at the sensor computer, an estimated time interval corresponding to the preconfigured size, or other factors.

If no instruction was received in operation 402 or if the size does not meet or exceed the preconfigured size in operation 404, the process 400 returns to operation 402. If an instruction was received or if the size of the first file meets or exceeds the preconfigured size, the process 400 proceeds to an operation 406. In the operation 406, a second file is created. Any subsequent captured data packets are then saved to the second file and are not saved to the first file. As such, no additional data packets are added to the first data file.

In an operation 410, the sensor computer compresses the captured data packets stored in the first data file. The sensor computer then sends the compressed data file to the data sink server 118. The data sink server, in turn, stores the captured data packets and makes them available to, for example, the command server 102.

4.0 Network Packet Filters

Sensor computers executing network packet filters usually collect large amounts of data such as data packets, random or redundant data. Even if the sensors store the captured data in compressed files, the sensors may still require large storage. If the required storage space is unavailable, then performance of the sensors and their filters may be negatively impacted or stalled. Also, if the sensors keep collecting data associated with an IP address that has become inactive, the IP address cannot be reallocated to another user. This may lead to underutilization of IP addresses, and eventually to problems in monitoring compromised computers.

One approach for improving the effectiveness of network packet filters is configuring the filters to operate in certain modes. A mode is a way of configuring a filter on a sensor computer to collect data according to certain specifications. Examples of different modes include a survey collection mode and a sustained collection mode. In a survey collection mode, data packets are collected during certain time intervals and until an expiration time expires. In a sustained collection mode, data packets are collected continuously until the expiration time expires.

A mode may be defined, for example, using a programmable configuration file that includes values for data collection parameters. Values for the data collection parameters may specify the type of data packets to be collected, the timing for collecting the data, the conditions for collecting the data, and other characteristics of the data collection. A configuration file may be generated by a command server and transmitted to one or more sensor computers as a notification message, an instant message, and the like. A notification message may specify, for example, a time interval for capturing the data packets, an expiration time at which the capturing is to be terminated, an IP address of the compromised computer for which the data is to be collected, a port identifier on the sensor that is used to collect the data packets, and other parameters.

A sensor may execute a plurality of network packet filters that are configured in different modes. For example, a sensor may simultaneously execute filters that operate in a survey collection mode, and filters that operate in a sustain collection mode. The configurations of the filters executed on the sensor may be modified any time. For example, a command server may send a notification message to the sensor computer 106 to extend the life span of the filter executed on the sensor computer 106, to change the mode in which the filter operates, to terminate the filter, to add a new filter, and so forth. The command server may also instruct the sensor to compress the collected data packets, and to download the compressed data packets to a sink server.

4.1 Survey Collection Mode

In an embodiment, in survey collection mode, data packets are collected by the sensor computer during certain time intervals and until an expiration time expires, thereby permitting surveying the data packets at certain time intervals and until the time for collecting the data expires. The time interval may be defined at random, using a default value, or using a recommended value. The time interval is usually defined to collect critical information while redundant, irrelevant and/or voluminous data is omitted. For example, the time interval may direct the sensor to collect data packets only during business hours as the likelihood of compromising the computer 108 during business hours is high.

The survey collection mode defines how execution of a network packet filter on the sensor computer alternates between a data packet capturing state and a non-capturing state. In the capturing state, the network packet filter collects data packets according to collection instructions received from the command server 102 or other sources. In the non-capturing state, the network packet filter does not collect data packets and ignores or disregards the data packets intercepted by or received by the sensor computer.

A notification message may define the manner of alternating execution of the network packet filter on the sensor computer between the capturing state and non-capturing state. The notification message may specify, for example, a time interval during which the network packet filter is to collect data packets. The notification message may also specify an expiration time at which collecting of the data packets is to be terminated. In some situations, the message may specify a start time at which the collection is to start, an end time at which the collection is to end, a duration between the start and the end times, or a frequency with which the collection is to be repeated. For example, a notification message for defining a particular survey collection mode on a particular sensor computer may specify to collect data packets for two minutes at the beginning of every hour. The two-minute time interval is used to define the capturing state for executing the network packet filter on the particular sensor computer.

A notification message may also specify a plurality of different time intervals, starting times, ending times, durations of the time intervals, durations of breaks between the time intervals, and so forth. For example, a notification message for defining a particular survey collection mode on a particular sensor computer may request the sensor computer 106 to start collecting data packets for two minutes at 8 AM, for three minutes at 9 AM, and for four minutes at 10 AM for the next 180 days. The time intervals defined in the configuration file thus specify the capturing states for executing the network packet filter on the particular sensor computer.

4.2 Sustained Collection Mode

In the sustained collection mode, data packets are captured by the sensor computer continuously until expiration of a specified time. In the sustained collection mode, the sensor computer executes the network packet filter to continuously collect the data. The expiration time may be set to a randomly selected or pseudo-random value or a fixed default or suggested value. For example, the expiration time may be set to one day or to six days.

Settings for a sustained collection mode may be communicated using a notification message. The notification message may be generated by a command server and transmitted to a sensor computer to configure the network packet filter to collect the data with sustained collection.

Continuous collection also may occur until instructions to the contrary are received, or until a certain event takes place. For example, a network packet filter may continue to collect data packets until instructions to stop collecting the packets are received from a command server, or until a new extended expiration time, provided by a command server, expires.

Once collecting terminates, the network packet filter may be dormant until it receives an instruction message to reactivate the network packet filter. The message may include instructions for resuming the sustained collection mode on the network packet filter, and may provide a new expiration time. Another type of message may include instructions for activating another mode for operating the network packet filter. Such a message may include settings for initiating the sustained collection mode. For example, the message may provide instructions for starting the data collection on Saturday and for 180 days. The messages may be sent using any type of messaging system, including programmatic calls, text-based messaging system, instant message systems, electronic mail system, and the like.

In an embodiment, instructions for determining settings for the sustained collection mode and/or the survey collection mode may be generated using a graphical user interface (GUI) dashboard that is displayed on a display device of a command computer to manage the sensors. The dashboard may be operated to determine the settings, generate a notification message that includes the settings, and transmit the notification message to the sensors. The dashboard may also be used to display the data collected and provided by the sensors, to review the settings for the data collections and to adjust the settings for different modes for collecting the data.

4.3 Time Interval Values

A time interval indicates how data packets are to be collected by a sensor. A time interval also indicates how the sensor alternates between capturing and not capturing packets. The time interval value may indicate, for example, when to capture data packets or not collect data packets. The time interval value may be communicated to the sensor in a notification message sent by a command server. Upon receiving the notification message, the sensor may parse the message, identify the time interval value and use it to configure a network packet filter for capturing data packets.

If a network packet filter is configured with a certain non-zero time interval value, then a sensor is instructed to capture data packets in a survey collection mode and at the certain time interval. However, if the network packet filter is configured with a zero time interval value, then the sensor is instructed to capture data packets in a sustained collection mode until an expiration time expires.

A time interval value may be determined and modified by a central command server. For example, a time interval value may be initially set by the central command server to a default value, and then adjusted by the server as needed. The time interval value may be extended when for example, an insufficient amount of data has been collected thus far. The time interval value may be reset when for example, a network packet filter was temporarily disabled and/or when there is a need to collect additional data packets.

A network packet filter may also be configured using an interval frequency. An interval frequency may indicate how frequently the data packets are to be collected. This parameter may be modified by a central command server or any other server configured to manage the sensor computer 106, 110, and 114.

4.4 Expiration Times

A sensor may stop collecting data packets when an expiration time expires, or a collection expiration date occurs. An expiration time may be expressed as a time duration for collecting the data packets. A collection expiration date may be expressed as a date having a day, a month, a year and a time at which the collection of the data packets is to be stopped.

An expiration time may be used as a parameter to configure either a sustained collection mode or a survey collection mode of a filter on a sensor. By default, an expiration time may be defined in terms of a count of hours, minutes or seconds. For example, a sustained collection mode may have the expiration time set to two hours to indicate that the sustained collection of data packets is to be performed for two hours and terminated when the two-hour period expires.

Settings of expiration times may be determined by a command server 102 or any other server managing the sensors 106, 110, or 114. For example, the command server 102 may determine a setting for an expiration time for a particular sensor, generate a notification message that includes the determined setting, and transmit the message to the particular sensor. The message may indicate for example, an IP address of the compromised computer and the particular expiration time for collecting data from the compromised computer. Once the particular expiration time expires, the command server 102 may disable the packet filter on the sensor, or instruct the sensor to restart the packet filter and collect additional data packets.

Settings of expiration times may be modified or reset by a command server 102, or any other server computer managing the sensors. For example, the command server 102 may automatically modify the expiration time associated with a filter executed on the sensor computer 106. Modifications of the expiration time may include shortening of the time period or lengthening of the time period during which the sensor computer 106 collects data packets.

An expiration time for a network packet filter may be configurable at any point of the life cycle of the packet filter, and even if the execution of the network packet filter is terminated. For example, the command server 102 may generate a new notification message, include a new expiration time in the new notification message, and transmit the new notification message to the sensor to restart execution of the filter and capture data packets until the new expiration time expires.

5.0 Configuring a Sensor to Collect Data Packets

Instructions for capturing data may be provided to a sensor and a network packet filter in a variety of ways. For example, a command sever may send to a sensor computer a notification message that includes specifications of a particular mode and the parameter values to be used by the filter to collect the data packets in the particular mode. According to another example, the mode and the parameter values may be provided to the filter as a script communicated to a sensor in an instant message, an email, or a configuration file.

Figure 6:
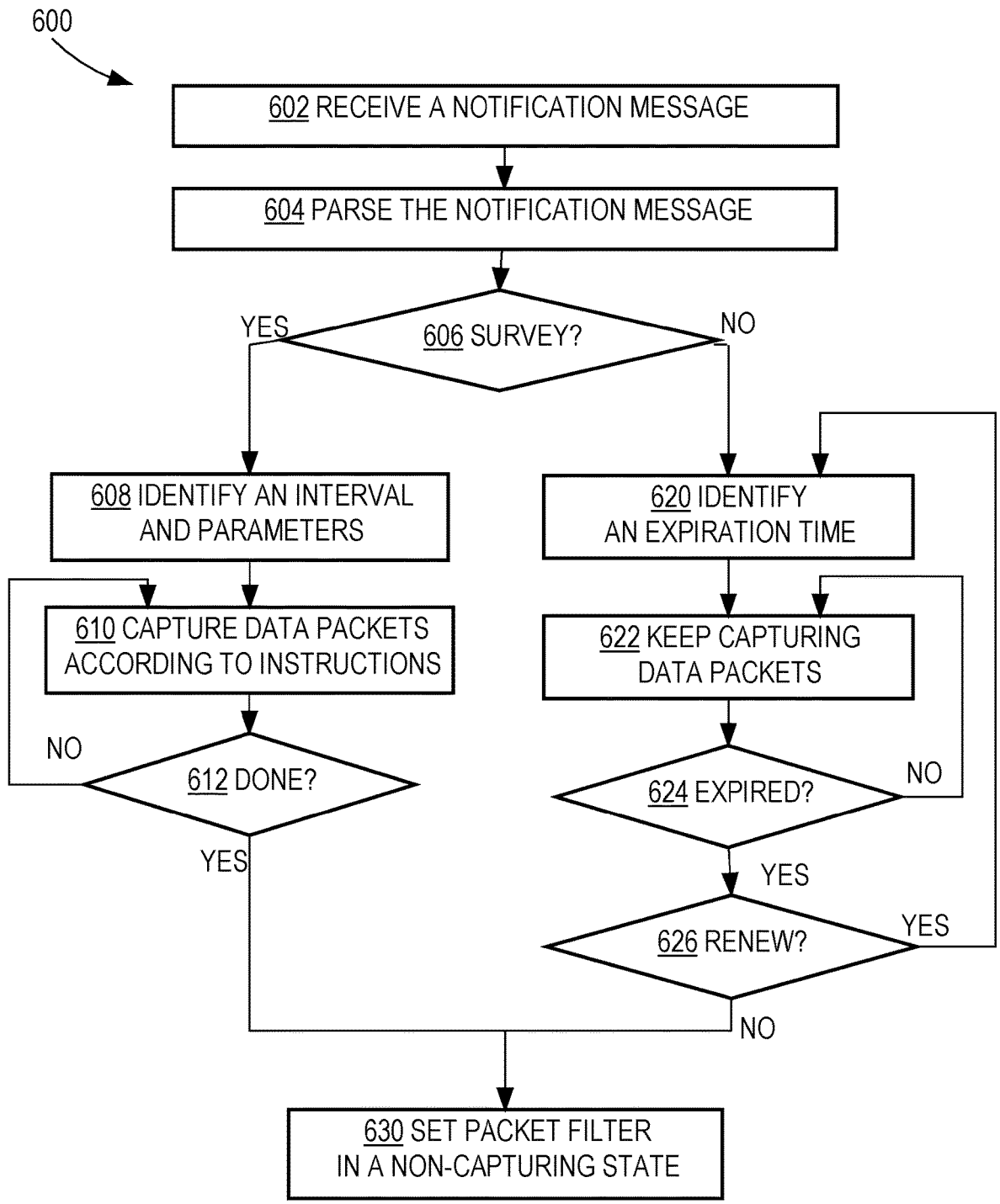
FIG. 6 depicts an example process of configuring a sensor computer to collect data packets.

FIG. 6 depicts an example process of configuring a sensor computer to collect data packets. In the example of FIG. 6, a process 600 may be performed as part of the operation 406 depicted in FIG. 4. The process 600 may be performed by the sensor computers 106, 110, and 114.

While the example process 600 shows two types of modes (a survey collection mode and a sustained collection mode), the process 600 may be adopted to situations in which additional and/or different modes are also available.

In an operation 602, a sensor computer receives a notification message for defining a mode for a network packet filter. The notification message may be received from the command server 102, or any other server managing the sensor computers 106, 110, and 114. The notification message may include instructions encoded as an ASCII file, a script file, an HTML file, or any other file that can be parsed by the sensor computer.

In an operation 604, the sensor computer parses the notification message to determine a type of the mode that is to be assigned to a network packet filter and to determine values for the parameters used by the filter. For example, the sensor computer may parse the notification message to determine whether the sensor is to operate in a sustained collection mode or a survey collection mode. If the message includes an indication of a non-zero interval value, then the requested mode is a survey collection mode, in which the collection is repeated every time interval and until an expiration time expires. However, if the message includes an indication of a zero interval value, then the requested modes is a sustained collection mode, in which the collection is continued until the expiration of the expiration time. Values of the parameters used by the filter operating in the indicated mode may be encoded as pairs, where a pair includes a parameter name and a parameter value.

In an operation 606, a test is performed to determine whether the parsed notification message includes an indication that the mode is a survey collection mode. If the test indicates that the mode is the survey collection mode, then an operation 608 is performed. Otherwise, an operation 620 is performed.

In an operation 608, the sensor computer further analyzes the parsed information to identify a time interval, an expiration time, and other parameter values associated with the mode. For example, the sensor computer may determine that the parsed information includes instructions for collecting data from a compromised computer whose IP address is 1.2.3.4, and that the data collection is to be collected every other day for 180 days.

In an operation 610, the sensor computer captures data packets in accordance to the instructions included in the received notification message. For example, the instructions may instruct the sensor to collect data packets from a compromised computer every other day for 180 days, and then compress the collected data packets and transmit the compressed data to a sink server.

In an operation 612, a test is preformed to determine whether data packets have been collected according to the received instructions and if the expiration time included in the notification message has expired. If the expiration time has expired, then an operation 630 is performed. Otherwise, the sensor continues collecting data in the operation 610.

An operation 620 is performed if the sensor computer determines that the mode for capturing data packets is a sustained collection mode. This mode may be indicated in the notification message by setting a time interval to zero. Also, in the operation 620, the sensor computer identifies an expiration time for capturing data packets. The expiration time may be provided as a count of minutes, hours or seconds during which the data packets are to be collected. Alternatively, an expiration date and time may be provided to indicate the date/time at which the capturing of the data packets is to be terminated.

In an operation 622, the sensor computer starts capturing data packets. The capturing is performed until the expiration time, which is tested in operation 624.

In an operation 624, a test is performed to determine whether the expiration time for capturing data packets has expired. If the time expiration time has expired, then an operation 626 is performed. Otherwise, the operation 622 is performed.

In an operation 626, a test is performed to determine whether a message to reset or modify the expiration time has been received. For example, as the sensor computer is capturing data packets, the sensors computer may receive instructions form a command server to extend the expiration time, or to set a new expiration time. If the new expiration time is provided, then the operation 620 is performed to set the new expiration time and to cause the sensor computer to continue capturing the data packets.

However, if a new expiration time has not been provided or the old expiration time has not been reset, then an operation 630 is performed.

In an operation 630, the sensor computer sets the network packet filter to a non-capturing state or a dormant state. The sensor computer may also generate and transmit instructions causing the sensor to terminate or delete the network packet filter from the sensor computer. Then, the sensor computer may continue executing the operation 406 and then the operation 408, both described in FIG. 4.

6.0 Configuring a Command Server to Manage Sensors

The command server 102, or any other command server managing the sensors computers 106, 110, and 114, may be programmed to instruct the sensor computers 106, 110, and/or 110 to collect certain data packets and according to a certain collection mode. Configuring the command sever 102 to manage the sensors may include configuring the command server 102 to generate various types of instructions for the sensors, to encapsulate the instructions into messages, and to transmit the messages to the sensors. For example, the command server 102 may be programmed to generate a notification message that includes specifications of a particular mode and the parameter values to be used by the sensor 106 to collect the data packets. The notification messages may be provided to the sensor computers as instant messages, emails, email attachments, scripts, and using any other media.

Figure 7:
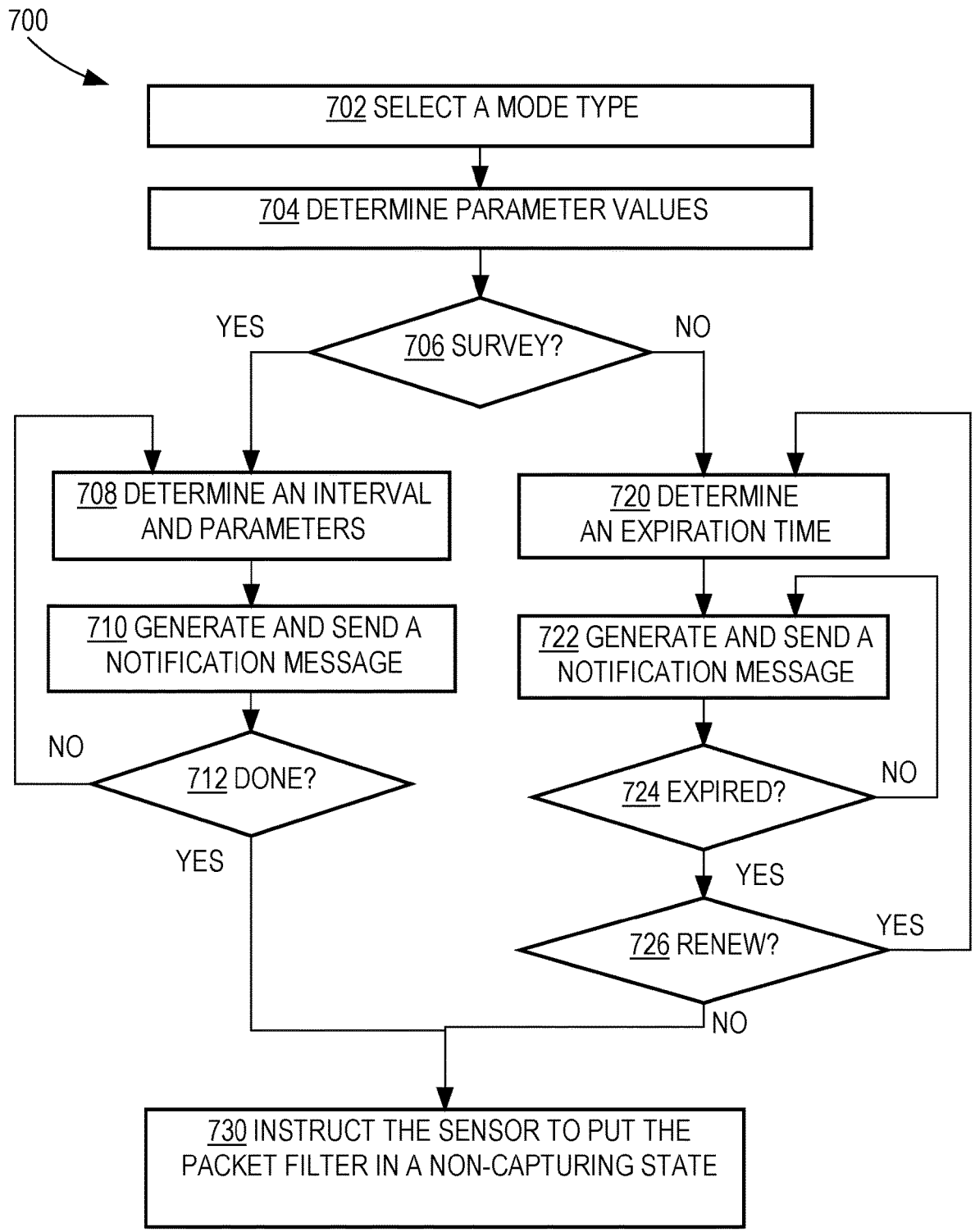
FIG. 7 depicts an example process of configuring a command server to instruct sensors to collect data packets.

FIG. 7 depicts an example process of configuring a command server to instruct sensors to collect data packets. In the depicted example, a process 700 may be performed as part of the operation 406 depicted in FIG. 4. The process 700 may be performed by the command server 102, or any other server computer that manages any of the sensor computers 106, 110, and 114. While the example process 700 shows a survey collection mode and a sustained collection mode, the process 700 may include generating instructions causing the sensors to operate in additional and/or different modes.

In an operation 702, a command server selects a mode type for a sensor and a network packet filter to be executed on the sensor. The depicted example refers to selection of either a survey collection mode or a sustained collection mode; however, other modes may also be implemented.

In an operation 704, the command server determines values of the parameters to be used by the filter to collect the data. The parameters may include a time interval for capturing the data, an expiration time by the end of which the collection of the data packets is to be stopped, a start time for capturing the data, a frequency with which the data packets are to be collected, and the like.

In an operation 706, a test is performed to determine whether the selected mode is a survey collection mode. If a survey collection mode is requested, then the command server 102 is programmed to assign a non-zero value to the time interval parameter. If a sustained collection mode is requested, then the command server 102 is programmed to assign a zero value to the time interval parameter. If the test indicates that the mode is the survey collection mode, then an operation 708 is performed. Otherwise, an operation 720 is performed.

In an operation 708, the command server identifies the time interval and values for one or more parameters associated with the survey collection mode. For example, the time interval value may be "1" to indicate that the data is to be collected every other day.

In an operation 710, the command server generates a notification message for the survey collection mode. The notification message may be an instant message, an ASCII file, a script file, an HTML file, or any other file that can be received and parsed by the sensor computer. The notification message may be transmitted to the sensor computer as a message, an attachment to a message, or any other form.

In an operation 712, a test is preformed to determine whether all values for the parameters used to execute the filter in the survey collection mode have been included in the notification message, and/or whether the notification message is to be modified. If no modifications are needed, then an operation 730 is performed. Otherwise, the operation 708 is performed to modify the content of the notification message.

An operation 720 is performed if the command server is programmed to generate a notification message for a sustained collection mode. In the operation 720, the command server determines an expiration time for capturing data packets. The expiration time may be provided as a count of minutes, hours or seconds during which the data packets are to be collected. Alternatively, the expiration time may also be provided as a date/time at which the capturing of the data packets is to be stopped.

In an operation 722, the command server generates a notification message for the sustained collection mode. The notification message may include the sustained collection mode identifier and the expiration time value. The sustain collection mode identifier may be a zero-value associated to a time interval parameter.

In an operation 724, a test is performed to determine whether the notification message has been successfully generated and whether all values for the parameters used to execute the packet capturing have been included in the configuration file. If the notification message was successfully created, then an operation 726 is performed. Otherwise, the operation 722 is performed.

In an operation 726, a test is performed whether the expiration time for the sustained collection mode should be modified and/or extended. For example, the command server may determine that the expiration time is to be extended because the collected data is inconclusive to determine whether the computer 108 has been compromised. If the command computer determines a new expiration time, then the operation 720 is performed to generate the new expiration time and generate a new notification message.

However, if the command computer determines no need for extending the expiration time, then an operation 730 is performed.

In an operation 730, the command server instructs the sensor to put the network packet filter in a non-capturing state. This may include deleting the files and data containing instructions for executing the filter on the sensor computer. This may also include storing the captured data packets, compressing the file in which the data packets have been stored, and sending a notification to a system administrator that the data collection task has been completed.

7.0 Example Notification Messages

Notification messages are messages that may be used to instruct a sensor to capture data packets according to a particular mode and in a particular way. The notification messages may be automatically generated by the command server 102 or any other computer server programmed to manage the sensor computers 106, 110, and 114. The notification messages may be generated according to a schedule or based on network traffic data. The notification messages may also be generated upon a request or upon an occurrence of certain events.

Notification messages may be communicated as programmatic calls, instant messages, ASCII scripts, emails, and the like. The examples described below are provided to illustrate several ways of structuring notification messages; however, the provided examples are not to be viewed as a limitation on the approach.

FIG. 8A depicts example notification messages. An example 802 depicts a notification message that includes instructions for collecting data in a sustained collection mode. The message may be used to cause the sensor to continuously collect data on a host 1.2.3.4 for the next 60 days. Message 802 is used to set the sustained collection mode because it sets a time interval to zero days. The alphanumerical string 1.2.3.4 identifies an IP address of the compromised computer for which the data is to be collected. The expiration period is 60 days, and the time interval is zero indicating that the data collection is to be performed continuously, with no intervals, and for 60 days.

An example 804 depicts a notification message that includes instructions for collecting data from a host 5.6.7.8 in a sustained collection mode. The collection is to be continued for 180 days with no interruptions.

An example 806 depicts a notification message that includes instructions for collecting data from a host 1.2.3.4 in a sustained collection mode. The collection is to be continued for 120 days with no interruptions.

An example 808 depicts a notification message that includes instructions for collecting data from a host 1.2.3.4 in a sustained collection mode. The collection is to be continued for 180 days with no interruptions.

An example 810 depicts a notification message that includes instructions for collecting data from a host 9.10.11.12 in a survey collection mode. The collection is to be performed every other day for 60 days.

An example 812 depicts a notification message that includes instructions for collecting data on a port 3344 in a survey collection mode. The collection is to be performed every other day for 60 days.

An example, 814 depicts a notification message including instructions for extending data collection on a port 3344 in a survey collection mode every other day. The collection is to be extended by additional 120 days.

An example 816 depicts a notification message including instructions for collecting data on a port 3344 in a sustained collection mode. The collection is to be performed every other day for 180 days.

8.0 an Example Expiration Message

Expiration messages are messages that may be used indicate that a collection of data on a sensor has expired. The expiration messages may be automatically generated according to a schedule or based on network traffic data. The expiration messages may also be generated upon a request or upon occurrence of certain events. The expiration messages may be communicated as instant messages, ASCII scripts, emails, and the like. A non-limiting example of expiration messages is provided below.

FIG. 8B depicts an example expiration message. A depicted message 820 indicates that capturing data packets from the host 12.12.15.19 by a sensor called "SENSOR_1" expired on 2016 Jun. 16. The expiration message was created on 2016-06-16. The expiration message may also provide a hyperlink for renewing the packet capturing schedule. The hyperlink is implementation-dependent. The expiration message may also include a note communicating to a system administrator that the capturing of the data by the sensor has expired. The note may be printed in color or a particular font and may be preceded and/or followed with words like "fire" to grab the administrator's attention. In the example depicted in FIG. 8B, the message is preceded with a few repetitions of the word "fire," and followed with a few repetitions of the work "fire." Other methods of structuring the expiration message may also be derived.

9.0 Alert Messages

In an embodiment, a central command server is programmed, to generate alert messages and transmit the alert messages to a central alert message board. The alert messages may be generated according to different schedules and their generation may be triggered by different events. For example, the central command server may generate an alert message when a network packet filter is about to expire. Generating an alert message when a network packet filter is about to expire and transmitting such a message to the central alert message board allows providing a timely alert to a system administrator and give the administrator some time to determine whether the execution of the filter is to be extended.

In situations when alter messages may not be timely generated and/or delivered to a central alert message board, a central command server may temporarily extend an expiration time of a network packet filter to extend a life span of the filter. This may result in collecting additional data packets even if such a collection is undesirable. However, in some other situations, this may result in preventing a loss of valuable information needed to confirm that a particular server has been compromised.

10.0 Workload Evaluation

In an embodiment, a central command server is programmed to evaluate a workload and performance of the sensor computer 106 and a network packet filter executed by the sensor computer 106. The evaluation may include determining whether the workload meets certain evaluation criteria, and whether a sufficient amount of information has been captured by the sensor. Furthermore, the evaluation may include determining the effectiveness of the filter in terms of providing indications that that particular server is indeed compromised.

In an embodiment, an approach for improving the effectiveness of network packet filters is provided. The approach allows configuring the filters to operate in certain modes, including for example, a survey collection mode and a sustained collection mode. In a survey collection mode, data packets are collected during certain time intervals and until an expiration time expires. In a sustained collection mode, data packets are collected continuously until the expiration time expires.

By configuring network packet filters to operate in the above modes, collected data includes more relevant data and less random or redundant data. Furthermore, the collected data has smaller storage requirements and management of the sensors and the collected data is more efficient.

11.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
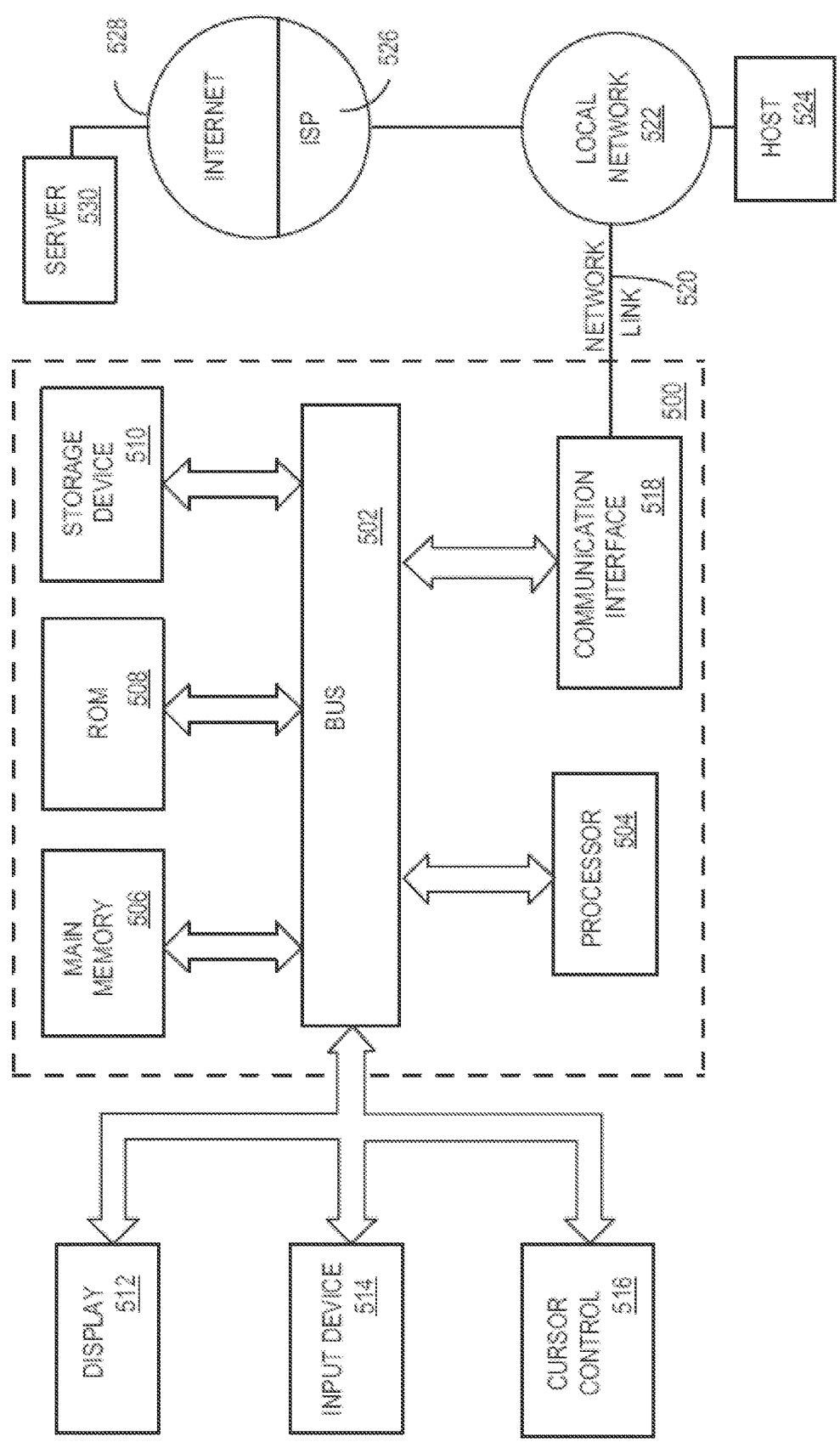
FIG. 5 is a block diagram that illustrates a computer system upon which an embodiment of the approach may be implemented.

For example, FIG. 5 is a block diagram that illustrates a computer system 500 upon which an embodiment of the approach may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated service digital network (ISDN) card, cable modem, satellite modem, or a modem to provide a data communication connection to a corresponding type of telephone line. As another example, communication interface

518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A computer system programmed to provide improved packet capture, the computer system comprising:
   a plurality of sensor computers each programmed to capture data packets routed toward a different compromised computer from one or more attacker computers;
   a command server that is programmed to:
      determine a first expiration time for capturing a first set of data packets that have been routed toward a first compromised computer;
      determine a first-time interval indicating an interval for capturing the first set of data packets that have been routed toward the first compromised computer;
      determine whether capturing the first set of data packets is to be extended beyond the first expiration time;
      in response to determining that capturing of the first set of data packets is to be extended beyond the first expiration time: generate a new expiration time; generate a new message that comprises a zero value as the first-time interval and the new expiration time; identify a first packet capture filter of a plurality of packet capture filters for a first sensor computer of the plurality of sensor computers for capturing the first set of data packets until the new expiration time expires; and transmit, via a communications network, the first packet capture filter and the new message.

2. The computer system of claim 1, wherein the command server that is further programmed to: identify a first packet capture filter of a plurality of packet capture filters for a first sensor computer of the plurality of sensor computers to capture the first set of data packets.

3. The computer system of claim 1, wherein the command server is further programmed to determine whether the first set of data packets is to be captured in a sustained collection mode; to assign a zero value to a first time interval in response to determining that the first set of data packets is to be captured in the sustained collection mode; to generate a message as a sustained collection mode message that comprises the zero value as the first time interval; wherein capturing the first set of data packets in the sustained collection mode includes capturing the first set of data packets until the first expiration time expires.

4. The computer system of claim 1, wherein the command server is further programmed to determine whether the first set of data packets is to be captured in a survey collection mode; to assign a non-zero value to a first time interval in response to determining that the first set of data packets is to be captured in the survey collection mode; to generate a message as a survey collection mode message that comprises the non-zero value as the first time interval; wherein capturing the first set of data packets in the survey collection mode includes capturing the first set of data packets every the first time interval and until the first expiration time expires.

5. The computer system of claim 4, wherein the command server is further programmed to determine whether capturing the first set of data packets in the survey collection mode is to be extended beyond the first expiration time; to generate a new expiration time in response to determining that capturing the first set of data packets in the survey collection mode is to be extended beyond the first expiration time; to generate the new message as a new survey collection mode message that comprises the non-zero value as the first time interval and the new expiration time; wherein capturing the first set of data packets in a new survey collection mode includes capturing the first set of data packets every the first time interval and until the new expiration time expires.

6. The computer system of claim 1, wherein the command server is further programmed to determine a second expiration time for capturing a second set of data packets that have been routed toward a second compromised computer, to determine a second time interval indicating an interval for capturing the second set of data packets that have been routed toward the second compromised computer, to identify a second packet capture filter of the plurality of packet capture filters for a second sensor computer of the plurality of sensor computers, to transmit, via the communications network, the second packet capture filter to instruct the second sensor computer to capture the second set of data packets that have been routed toward the second compromised computer every the second time interval and until the second expiration time expires.

7. The computer system of claim 6, wherein the command server is further programmed to generate configuration files for the plurality of sensor computers; wherein a first configuration file of the configuration files includes first instructions for the first sensor computer to execute the first packet capture filter on the first sensor computer; wherein a second configuration file of the configuration files includes second instructions for the second sensor computer to execute the second packet capture filter on the first sensor computer.

8. The computer system of claim 7, wherein both the first sensor computer and the first compromised computer are located in a first local area network; wherein both the second sensor computer and the second compromised computer are located in a second local area network; wherein the first local area network is different from the second local area network; wherein the command server is not in the first local area network or the second local area network.

9. The computer system of claim 8, further comprising a data sink server programmed to receive, from the first sensor computer and the second sensor computer, the first set of data packets and the second set of data packets; wherein the data sink server is further programmed to store the first set of data packets and the second set of data packets in a storage device.

10. The computer system of claim 9, wherein the command server is programmed to generate and transmit an instruction to the first sensor computer to instruct the first sensor computer to upload the first set of data packets to the data sink server.

11. A computer-implemented method for improved packet capture in a networked environment, the method comprising:
determining, by a command server, a first expiration time for capturing a first set of data packets that have been routed toward a first compromised computer;
determining, by the command server, a first-time interval indicating an interval for capturing the first set of data packets that have been routed toward the first compromised computer;
determining, by the command server, whether capturing the first set of data packets is to be extended beyond the first expiration time;
in response to determining that capturing of the first set of data packets is to be extended beyond the first expiration time: generating, by the command server, a new expiration time; generating a new message that comprises a zero value as the first-time interval and the new expiration time; identifying a first packet capture filter of a plurality of packet capture filters for a first sensor computer of a plurality of sensor computers for capturing the first set of data packets until the new expiration time expires; and transmitting, via a communications network, the first packet capture filter and the new message.

12. The computer-implemented method of claim 11, further comprising: identifying a first packet capture filter of a plurality of packet capture filters for a first sensor computer of the plurality of sensor computers to capture the first set of data packets.

13. The computer-implemented method of claim 11, further comprising: determining whether the first set of data packets is to be captured in a sustained collection mode; assigning a zero value to a first time interval in response to determining that the first set of data packets is to be captured in the sustained collection mode; generating a message as a sustained collection mode message that comprises the zero value as the first time interval; wherein capturing the first set of data packets in the sustained collection mode includes capturing the first set of data packets until the first expiration time expires.

14. The computer-implemented method of claim 11, further comprising: determining whether the first set of data packets is to be captured in a survey collection mode; assigning a non-zero value to a first time interval in response to determining that the first set of data packets is to be captured in the survey collection mode; generating a message as a survey collection mode message that comprises the non-zero value as the first time interval; wherein capturing the first set of data packets in the survey collection mode includes capturing the first set of data packets every the first time interval and until the first expiration time expires.

15. The computer-implemented method of claim 14, further comprising: determining whether capturing the first set of data packets in the survey collection mode is to be extended beyond the first expiration time; generating a new expiration time in response to determining that capturing the first set of data packets in the survey collection mode is to be extended beyond the first expiration time; generating the new message as a new survey collection mode message that comprises the non-zero value as the first time interval and the new expiration time; wherein capturing the first set of data packets in a new survey collection mode includes capturing the first set of data packets every the first time interval and until the new expiration time expires.

16. The computer-implemented method of claim 11, further comprising: determining a second expiration time for capturing a second set of data packets that have been routed toward a second compromised computer; determining a second time interval indicating an interval for capturing the second set of data packets that have been routed toward the second compromised computer; identifying a second packet capture filter of the plurality of packet capture filters for a second sensor computer of the plurality of sensor computers; transmitting, via the communications network, the second packet capture filter to instruct the second sensor computer to capture the second set of data packets that have been routed toward the second compromised computer every the second time interval and until the second expiration time expires.

17. The computer-implemented method of claim 16, further comprising: generating configuration files for the plurality of sensor computers; wherein a first configuration file of the configuration files includes first instructions for the first sensor computer to execute the first packet capture filter on the first sensor computer; wherein a second configuration file of the configuration files includes second instructions for the second sensor computer to execute the second packet capture filter on the first sensor computer.

18. The computer-implemented method of claim 17, wherein both the first sensor computer and the first compromised computer are located in a first local area network; wherein both the second sensor computer and the second compromised computer are located in a second local area network; wherein the first local area network is different from the second local area network; wherein the command server is not in the first local area network or the second local area network.

19. The computer-implemented method of claim 18, further comprising: receiving, by data sink server, from a first sensor computer and a second sensor computer, the first set of data packets and the second set of data packets; wherein the data sink server is further programmed to store the first set of data packets and the second set of data packets in a storage device.

20. The computer-implemented method of claim 19, further comprising: generating and transmitting an instruction to the first sensor computer to instruct the first sensor computer to upload the first set of data packets to the data sink server.

* * * * *